United States Patent [19]

Becker et al.

[11] Patent Number: 4,970,592
[45] Date of Patent: * Nov. 13, 1990

[54] HORIZONTAL SYNCHRONIZATION, CLOCK SYNCHRONIZATION, D.C. RESTORATION AND GAIN CONTROL SCHEME FOR AN ANALOG TV SYSTEM

[75] Inventors: Neal D. Becker, Thurmont; Ajit Shenoy, Silver Spring; Lin-nan Lee, Potomac, all of Md.

[73] Assignee: Communications Satellite Corporation, Washington, D.C.

[*] Notice: The portion of the term of this patent subsequent to May 9, 2006 has been disclaimed.

[21] Appl. No.: 226,493

[22] Filed: Aug. 1, 1988

[51] Int. Cl.⁵ .................................................... H04N 7/073
[52] U.S. Cl. ..................................... 358/147; 358/142; 358/176
[58] Field of Search ............... 358/146, 147, 142, 176, 358/174, 171

[56] References Cited

U.S. PATENT DOCUMENTS

| | | | |
|---|---|---|---|
| 2,240,600 | 5/1941 | Applegarth | 358/176 |
| 2,240,601 | 5/1941 | Applegarth | 358/176 |
| 3,436,471 | 4/1969 | Mounts et al. | 358/147 |
| 3,472,962 | 10/1969 | Sanford | 358/147 X |
| 3,493,674 | 2/1970 | Houghton | 358/147 |
| 3,755,624 | 8/1973 | Sekimoto | 358/142 |
| 4,350,999 | 9/1982 | Mortimer | 358/147 |
| 4,479,150 | 10/1984 | Ilmer et al. | 358/147 X |
| 4,797,744 | 1/1989 | Klemmer et al. | 358/176 X |
| 4,829,377 | 5/1989 | Becker et al. | 358/147 |

FOREIGN PATENT DOCUMENTS

| | | | |
|---|---|---|---|
| 2419279 | 10/1975 | Fed. Rep. of Germany | 358/147 |
| 2419280 | 11/1975 | Fed. Rep. of Germany | 358/147 |

Primary Examiner—James J. Groody
Assistant Examiner—Mark R. Powell
Attorney, Agent, or Firm—Sughrue, Mion, Zinn, Macpeak & Seas

[57] ABSTRACT

An analog TV system includes a transmitter which produces a horizontal unique pulse sequence during each horizontal blanking interval. The pulse sequence is amplitude modulated between two levels to define a horizontal unique word for horizontal synchronization. The frequency of the pulse sequence is selected for use by the receiver section as the color subcarrier phase reference. The average level of the pulse sequence is set at the transmitter and used at the receiver for DC restoration in a clamping circuit. The peak amplitude of the pulses of the pulse sequence define a reference level against which a receiver produced local reference is compared for AGC. As four separate functions are accomplished by a single unique pulse sequence transmitted during the horizontal blanking interval, which four functions are typically accomplished using four separate signals transmitted sequentially during the horizontal blanking interval, a substantial portion of the horizontal blanking interval remains available for other data.

24 Claims, 5 Drawing Sheets

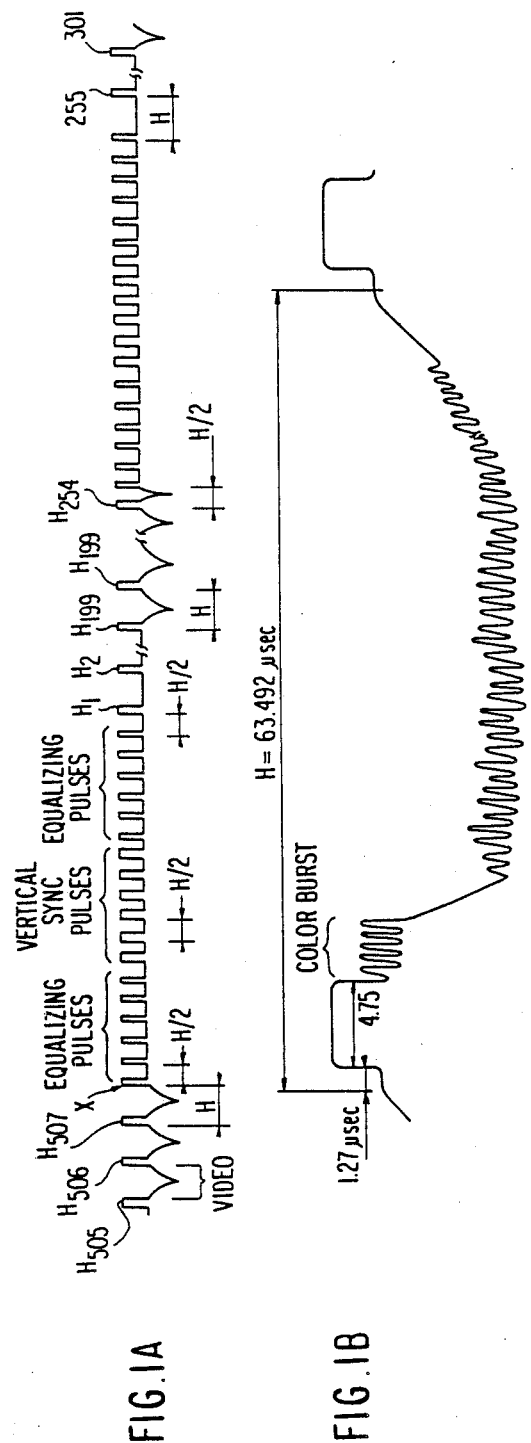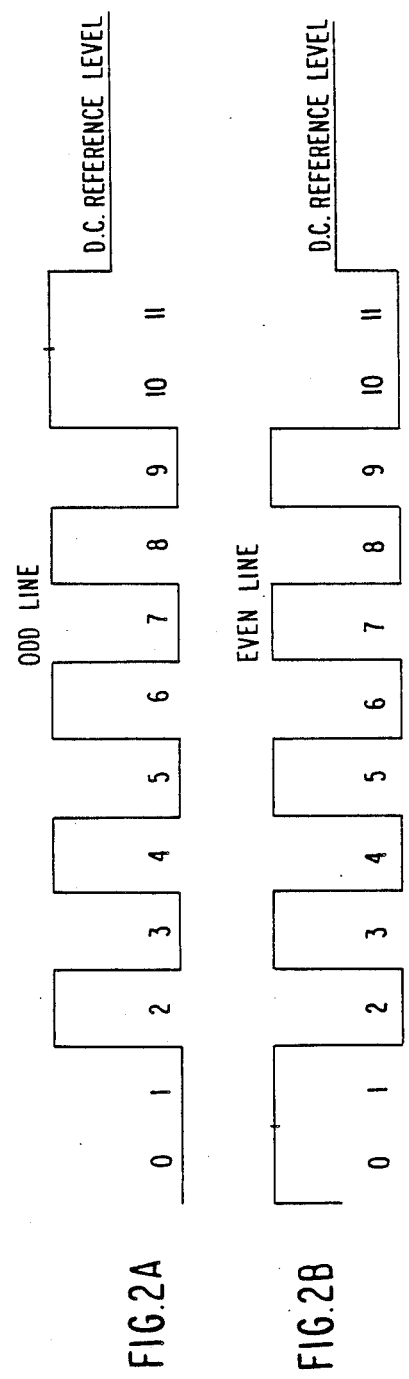
FIG.1A
FIG.1B
FIG.2A
FIG.2B

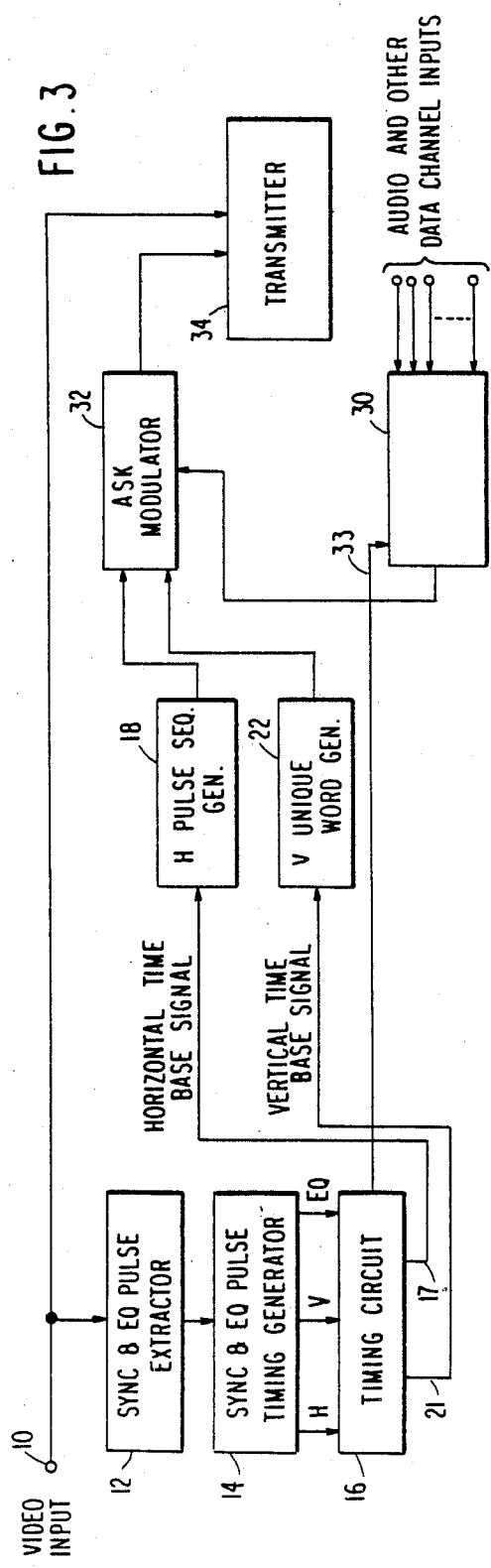
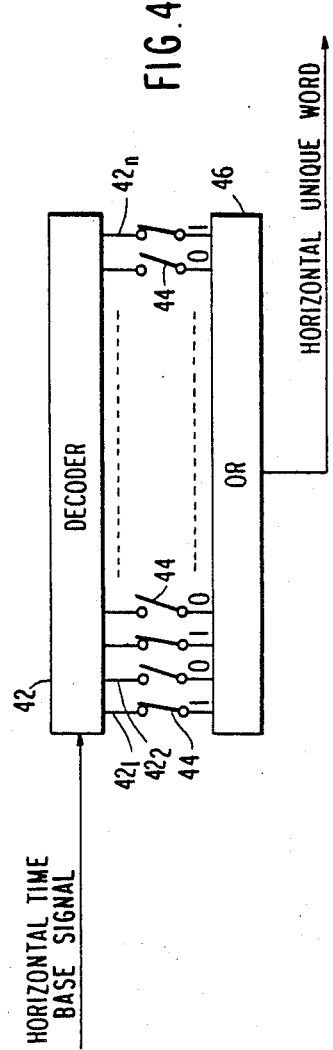

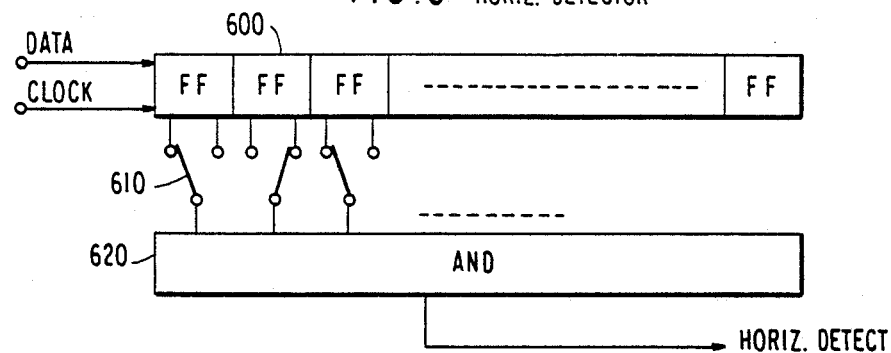
FIG.6 HORIZ. DETECTOR
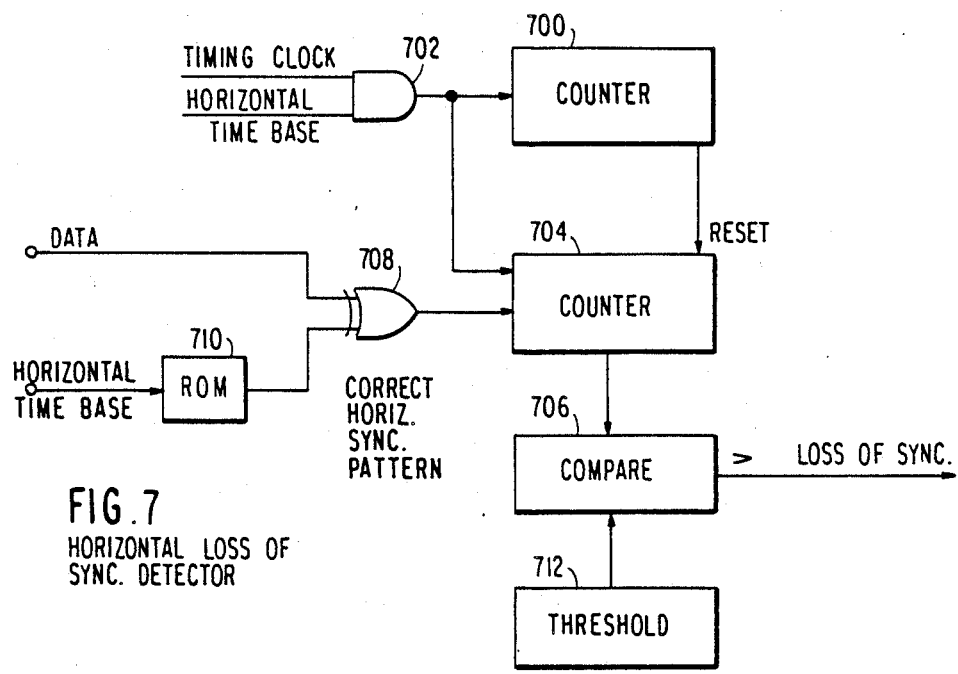
FIG.7 HORIZONTAL LOSS OF SYNC. DETECTOR
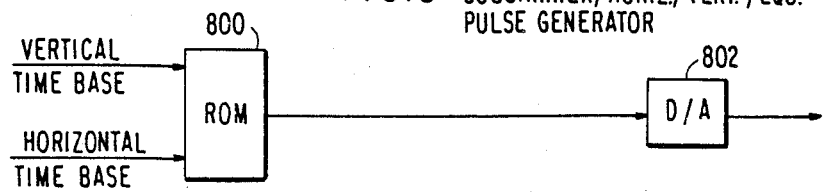
FIG.8 SUBCARRIER/HORIZ./VERT./EQU. PULSE GENERATOR

VERTICAL DETECTOR

HORIZONTAL SYNCHRONIZATION, CLOCK SYNCHRONIZATION, D.C. RESTORATION AND GAIN CONTROL SCHEME FOR AN ANALOG TV SYSTEM

This is a continuation, of application Serial No. 07/163,486 filed Mar. 3, 1988, which is a Pat. No. 4,829,377 of application Serial No. filed.

BACKGROUND OF THE INVENTION

Field of the Invention

The invention is in the field of analog television systems such as the NTSC and MAC video systems and specifically in techniques and implementing apparatus for establishing horizontal and vertical synchronization and other reference levels for reproducing video information at the receiver.

In conventional television systems video information is transmitted in frames, each frame consisting of a plurality of horizontal lines. In a typical known system, each frame consists of 525 horizontal synch pulses, and the frame intervals to vertical synch pulses. FIG. 1A shows a typical example of a color TV signal including the vertical and horizontal sync pulses, video information, equalizing pulses and color burst. The type of signal shown is conventional and would appear in a normal TV transmission system. The particular format of the waveform shown is that which would occur for an interlaced scanning system in Which each frame is 525 lines long. As it is illustrated in the diagram the prior frame terminates at point X on the graph after the 507th horizontal line of video information preceded by horizontal synch pulse H 507, and the new frame begins at the same point. The frame begins with six equalizing pulses followed by six vertical synch pulses followed by six more equalizing pulses. The vertical synch pulses and the equalizing pulses are separated by a distance H/2. where H is the horizontal line time. Typically, the equalizing pulses will be 2.4 microseconds in width and the vertical synch pulses will be 27 microseconds in width. The group of 12 equalizing pulses and six vertical synch pulses which follows the beginning of the frame will be referred to hereinafter as the Field 1 or odd field synch group. The designation is hereinafter used only for the purpose of distinguishing betWeen the two groups of equalizing and vertical synch pulses, the first group preceding the first field of the frame and the second group preceding the second or even field of frame.

Following the last equalizing pulse of the Field 1 synch group are a plurality of horizontal synch pulses (254 in the particular example described) which are separated by a distance H. It should also be noted that the first horizontal synch pulse following the last equalizing pulse is separated therefrom by distance H/2. The color burst information, if there is color transmission, and the video information for the particular line, follows the horizontal synch pulse for the line.

The last horizontal synch pulse within the first field is followed by the Field II or even field synch group which comprises six equalizing pulses followed by six vertical pulses followed by six more equalizing pulses. The first equalizing pulse within the Field II synch group is separated from the beginning of the last horizontal synch pulse 254 within the first field by the distance H/2. Following the last equalizing pulse of the Field II synch group are the remaining horizontal synch pulses and associated video information. Since the diagram represents the television transmission signal used in an interlaced scanning TV system, the first horizontal synch pulse folloWs the Field 1 sYnch group by H/2 whereas the first horizontal synch pulse in the second field follows the Field II synch group by distance H. The converse relation, as can be seen in the diagram is true for the last horizontal pulse in each field and the Field I and II synch groups.

Since the frame time is 525 H. and since each field synch group occupies a space of 9H. there will be 507 horizontal synch pulses per frame. It will be noted from the diagram that the first few horizontal synch pulses following each field synch group are inactive, i.e.. no video associated therewith. There will be about 17 inactive synch pulses per frame. This is conventional in TV transmission.

A portion of the total Waveform diagram representing the horizontal synch pulses and the associated video is illustrated in FIG. 1B. As shown in that figure, each horizontal line of approximately 63 microseconds includes a horizontal blanking signal during a horizontal blanking interval of approximately 10 microseconds. This blanking signal includes a 1.27 microsecond front porch, followed by a 4.75 microsecond horizontal blanking pulse followed by a color burst frequency (if color transmission is involved). The line video information follows the color burst. The color burst, that is,. the color subcarrier used for clock phase synchronization may typically consist of several cycles of a 3.58 MHz sinusoidal waveform and is necessary to very precisely maintain the phase relationship of the transmit and receive side clock signals, thereby preventing color distortion.

It is well known that analog TV systems require DC restoration and automatic gain control at the receiver. Typically, the DC restoration procedure involves the transmission of a reference level usually in the horizontal blanking interval. At the receiver the received level is clamped in a DC level clamping circuit to the original level represented by the reference level transmitted during the horizontal blanking interval. The typical gain control technique involves the transmission of a second reference level. Assuming that the DC level has been properly restored. the received signals are then forced to the proper levels through gain adjustment after measuring the difference between the received second reference level and the actual second reference level generated at the receiver.

The disadvantage of the conventional horizontal synchronization technique is the requirement for a level which is not used in the video signal. This translates to additional power requirements of approximately 3dB in either AM or FM analog systems. The disadvantage of the aforementioned DC restoration and automatic gain control. AGC, techniques is their requirements for specific reference levels to be transmitted in the horizontal blanking interval. The time intervals used to transmit these reference levels are then unavailable for other purposes. Indeed, in a conventional system about 16% of a complete horizontal line period is spent for retrace,. synchronization and reference level determination purposes.

In U S. Pat. No. 3,666,888 which issued on May 30, 1972 to Sekimoto and which is assigned to the assignee of the present invention, there is disclosed a digital TV system and specifically a PCM TV transmission system in which the horizontal synchronizing signal is not transmitted. Rather,. a unique digital word is transmitted for every horizontal line in place of the horizontal synchronizing signal to convey the horizontal synchronization timing information. The Sekimoto unique word is 20 or 30 bits long and can convey the horizontal synchronization timing information in a time interval significantly shorter than the horizontal blanking interval available for other purposes, such as transmitting audio and data channels. Use of a horizontal unique digital word for horizontal line synchronization information is, however,. not known in the analog TV art where the video information as well as the vertical and horizontal synchronization timing information are transmitted as modulated analog signals.

While the transmission of a horizontal unique digital word for horizontal synchronizing timing information would free up portions of the horizontal blanking interval for digital audio and data channels. there still remains the problem that in analog T V systems substantial portions of the horizontal blanking interval must remain available for the color burst clocking signal and for the DC restoration and AGC reference levels and therefore,. substantial portions of the horizontal blanking interval remain unavailable for audio and data channels.

Summary of the Invention

An analog TV system is modified such that in each horizontal line the conventional horizontal synchronizing signal,. the color subcarrier phase reference signal, and the DC restoration reference signal are eliminated and replaced by a single horizontal unique pulse sequence having a duration substantially less than the horizontal blanking interval. In addition an AGC reference level is established without transmission of an AGC reference level signal. The pulse sequence is formatted to include characteristics for effecting not only horizontal line synchronization but also DC restoration,. automatic gain control and phase adjustment of the clock signals. The remaining horizontal blanking interval is available for other signals such as digital audio and digital data.

The horizontal unique pulse sequence consisting of several pulses defines a horizontal unique word which conveys horizontal synchronization timing information. In one embodiment of the invention, the pulse sequence is pulse amplitude modulated, PAM, for encoding the horizontal unique word. Other variable characteristics of the horizontal unique pulse sequence are used to encode information necessary for producing a color subcarrier phase reference signal and the reference levels for DC restoration and automatic gain control.

With the pulses of the horizontal unique pulse sequence pulse amplitude modulated for encoding the horizontal unique word, the pulse frequency is used to define a color subcarrier phase reference signal against which receiver generated color subcarrier signals can be compared and phase adjusted. In this way no separate color burst need be transmitted during the horizontal blanking interval. It is convenient to divide the pulse sequence into sub-sets with for example, one sub-set of a selected number of pulses defining the horizontal unique selected number of pulses defining the horizontal unique word, while another sub-set of a selected number of pulses in an alternating one-zero pattern of logic levels provides a number of cycles of the phase reference burst of color burst synchronization. For example, a twelve bit word might be divided into two sub-sets, eight bits defining the horizontal unique word, with the remaining four bits forming an alternating one-zero color subcarrier phase reference pattern. This assures a number of detectable pulses for phase reference purposes.

For DC restoration the receiver must be provided with a signal having a reference level to which the base band signal is to be returned. According to a further feature of the invention, the horizontal unique pulse sequence is transmitted with a preselected average DC level which corresponds to the reference level for DC restoration at the receiver. The reference level for automatic gain control is transmitted as part of the pulse sequence by setting the peak level of the transmitted pulses at the AGC reference level.

Thus a pulse sequence in each horizontal blanking interval, which sequence occurs in a time interval substantially shorter than the horizontal blanking interval provides a horizontal unique word for horizontal synchronization timing information, the phase reference color subcarrier signal for color subcarrier synchronization at the receiver, as well as two different reference levels, one for DC restoration. the other for automatic gain control.

With this technique, a very substantial portion of the horizontal blanking interval is available for other service. In addition, there are no special power requirements for transmission of the synchronization signal. Still further horizontal synchronization, color subcarrier synchronization. DC restoration and gain control are reliably achieved. Additionally, other unique digital words may also be generated at the transmitter such as for vertical synchronization.

BRIEF DESCRIPTION OF THE DRAWINGS

FIGS. 1A and 1B are waveform diagrams of typical television signals.

FIGS. 2A and 2B are waveform diagrams of horizontal unique pulse sequences according to the teachings of the invention.

FIG. 3 is a block diagram of portions of a television transmitter in accordance with the present invention which can transmit the horizontal unique pulse sequence and digital data during the horizontal blanking interval, as well as a vertical unique word.

FIG. 4 is a block diagram of a preferred embodiment unique pulse sequence generator in accordance with the teachings of the present invention.

FIG. 6 is a block diagram of a preferred embodiment of a horizontal unique pulse sequence detector according to the teachings of the invention.

FIG. 7 is a block diagram of a preferred embodiment of the horizontal loss of sync detector.

FIG. 8 is a block diagram of a preferred embodiment of a horizontal, vertical, subcarrier and equalization sync pulse generator.

DETAILED DESCRIPTION OF THE PREFERRED EMBODIMENT

Figure 5:
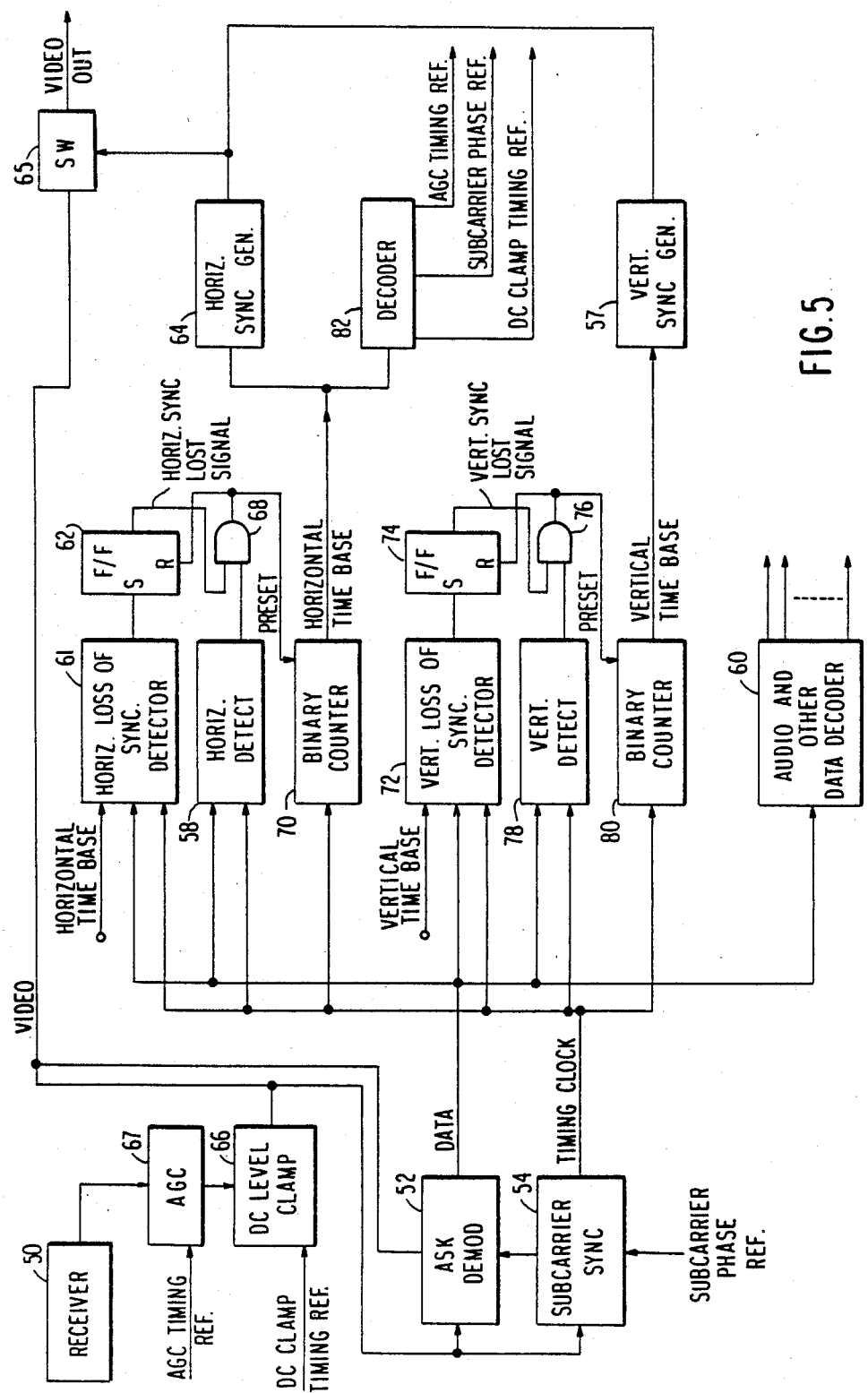
FIG. 5 is a block diagram of a portion of a television receiver adapted to receive the horizontal unique pulse sequence of the invention.

The following description of a preferred embodiment of the invention assumes an analog TV system with a scan line of approximately 63.5 microseconds compatible with the NTSC raster with two interlaced fields comprising a 525 line frame with a 15.734 KHz line rate. At least 52 microseconds of the scan line are allocated to video information transmission. During the remaining portion of the scan line which corresponds to the horizontal blanking interval other information is transmitted. It is to be understood that the invention is not limited to a TV system having a 63.5 microsecond scan line, and that the invention is equally applicable to any raster TV system.

FIGS. 2A and 2B are diagrams representing horizontal unique pulse sequences according to the teachings of the invention. The horizontal unique pulse sequence may be twelve pulses in length and have logic levels which define the horizontal unique word. Of course, the pulse sequence defined by this invention is not limited to twelve bits and can, indeed, be of any length provided the total length of the sequence is substantially less than the horizontal blanking interval. In FIGS. 2A and 2B the pulse sequence is shown, for illustration purposes, divided into two sub-sets. A first sub-set, consisting of the first four (pulses 0–3) and the last four (pulses 8–11) pulses of the sequence, define the horizontal unique word. The second sub-set of four pulses (pulses 4–7) is an alternating one-zero pattern providing the color subcarrier phase reference signal for color information synchronization.

In the preferred embodiment of the invention, digital audio and other digital data including the horizontal unique pulse sequence may be encoded in a conventional manner into a four-level PAM signal the outer two levels of the four level signal being used for amplitude modulation of the horizontal unique pulse sequence. The frequency of the transmitter PAM signal, consisting of the horizontal pulse sequence according to this invention, the audio and other digital data and, when desired, a vertical unique word, is conveniently 14.32 Mbits/s, a whole number multiple of 3.58 MHz. The 14.32 Mbits/s four level PAM signal is preferable since after low-pass filtering with a 3dB bandwidth of 4 MHz, the signal has an overall bandwidth within the 4.5 MHz video bandwidth. This approach is feasible because the four-level signal has a symbol rate of 7.16 Msym/s, with most of the signal energy concentrated within 4 MHz. The PAM modulation of the digital signals can be effectively carried out using a conventional amplitude shift keying (ASK) modulator.

The pulse sequence of FIG. 2A may be used for the synchronization timing of odd lines while the pulse sequence of FIG. 2B which is the inverse of the FIG. 2A pulse sequence, may be used for the synchronization timing of even lines. It is to be understood that the teachings of the invention do not require the use of two horizontal unique Words where distinguishing between the odd and even lines of a field is not required or where other techniques are used to distinguish between the odd and even lines.

FIG. 3 is a block diagram of those portions of a transmitter which can produce the horizontal pulse sequence of the invention, as well as a vertical unique word, and ASK modulate this information for transmission with the video information. The balance of the transmitter is conventional and therefore, not discussed herein. The input waveform corresponding to the waveform of FIG. 1A appears at terminal 10 and is applied to synch and equalizing pulse extractor 12. The extractor circuit 12 which passes the horizontal and vertical synch pulses as well as the equalizing pulses is well known in the art.

The pulses from the extractor circuit 12 are applied to a synch and equalizing pulse timing generator 14, which is also well known in the art. It functions to provide output spikes on respective horizontal synch, vertical synch and equalizing pulse leads corresponding to the input horizontal synch, vertical synch and equalizing pulses.

The output spikes from the timing generator 14 are applied to a timing circuit 16 which is also in the prior art. The timing circuit 16 sends a horizontal time base signal via lead 17 to the horizontal pulse sequence generator 18, and a vertical time base signal via lead 21 to the vertical unique word generator 22. When digital audio or other digital data is to be transmitted along with the synch words during the horizontal blanking interval clock pulses are also sent to the digital audio and other data circuit 30 via lead 33. Following each input spike to timing circuit 16, the timing circuit provides a number of pulses corresponding to the number of pulses in the pulse sequence generated by the corresponding unique word generator. In the preferred embodiment, the horizontal unique pulse sequence is twelve bits long. Therefore, twelve pulses are sent to horizontal pulse sequence generator 18 in response to a horizontal spike, which twelve pulses are followed by a reset pulse. Similarly, in response to a vertical spike, a number of pulses corresponding to the number of bits in the vertical unique word are sent to the vertical unique word generator. followed by a reset pulse.

The horizontal unique pulse sequence and the vertical synch unique word, along with the digital data, are sent to an ASK modulator 32 whose output is connected to a transmitter 34 which also receives the video information signal for transmission, in a conventional manner, to a receiving side of the TV system.

One form of a unique word generator which may be used for producing the horizontal unique pulse sequence is illustrated in FIG. 4. This unique word generator may also be used as the unique word generator for generating vertical unique words. The illustrated unique pulse sequence generator includes a decoder 42, a bank of switches 44, and an OR gate 46. The horizontal time base signal is detected by the decoder 42. The decoder is arranged so that there is an output pulse on its first output lead $42_1$ in response to the first pulse of the time base reference an output pulse on its second out lead $42_2$ corresponds to the arrival of the second pulse of the time base sequence and so on until a pulse appears on the last output lead $42_n$ when a number of pulses equal to the pulses in the unique pulse sequence has arrived. The decoder is constructed so that the peak amplitude of its output pulses is a preselected value determining the reference level for use in the AGC operation at the receiving side.

The particular coded form of the unique word is determined by setting switches 44, which when closed, connect the corresponding output terminals from the decoder 42 to the OR gate 46. Thus, different unique words are generated by changing the settings of the switches 44. Therefore a unique pulse sequence generator as illustrated in FIG. 4 may be used to generate the horizontal unique pulse sequence, and the vertical unique word by simply changing the settings of the switches 44 to define the different unique pulse sequences.

A block diagram of those portions of a receiver for receiving the signal transmitted by the transmitter of FIG. 3 and recovering the horizontal synch and vertical synch signals, and the digital data as well as the reference levels and the color subcarrier phase reference signal for color synchronization and other synchronization purposes is illustrated in FIG. 5.

Signals from transmitter 34 are received by a receiver 50 which reproduces the video signal which appeared at the input to the transmitter. The reproduced video signal is applied to the AGC circuit 67 for gain control and to the DC level clamp circuit 66 to restore the reference DC level. The AGC circuit receives a timing pulse, indicating when the horizontal unique word pattern should be present derived from the horizontal unique pulse sequence contained in the transmitted video signal by decoder 82 responsive to the horizontal time base produced by binary counter 70 as will be explained hereinafter. Similarly, the DC level clamp receives a timing pulse, indicating when the horizontal unique word pattern should be present derived from the horizontal pulse sequence contained in the transmittal video signal by the decoder 82 responsive to the horizontal time base.

The video output from the DC level clamp 66 is applied to an ASK demodulator 52, a subcarrier synchronization circuit 54 and to a switch 65 responsive to the horizontal and vertical sync signals from the horizontal sync generator 64 and the vertical sync generator 57, respectively. The ASK demodulator demodulates the video to produce the data output which corresponds to the data input to the ASK modulator 32 within the transmitter. The subcarrier sync circuit 54 reproduces the timing clock, phase controlled by the subcarrier phase reference produced by the decoder 82 also in response to the horizontal time base.

Reproduction of the horizontal time base from the demodulated data and timing signal produced by the ASK demodulator and the subcarrier sync circuit, respectively, will now be described. The circuitry for the generating the horizontal time base includes the horizontal detector 58 (FIG.6). the horizontal loss of sync detector 61 (FIG.7), flip-flop 62, AND gate 68 and binary counter 70. Both the horizontal detector and the horizontal loss of sync detector receive the data and timing signals. The binary counter 70 receives the timing signals from the subcarrier sync circuit 54 the output of counter 70 being the horizontal time base.

When horizontal sync i ⓡ lost, the output from the horizontal loss of sync detector 61 sets the flip-flop 62 to enable the AND gate 68. When horizontal sync is established as detected by the horizontal detector 58, the output of AND gate 68 goes high to reset flip-flop 62 and preset counter 70 which, responsive to the timing signal, produces the horizontal time base.

The vertical time base is generated in a manner similar to that for generation of the horizontal time base. Specifically the vertical time base is generated by the binary counter 80 receiving the timing signals from the subcarrier sync circuit 54. When vertical sync has not been established as determined by the vertical loss of sync detector 72, flip-flop 74 is set enabling AND gate 76. When vertical sync is achieved upon detection of the vertical sync unique word in the vertical detector 78, the output of AND gate 76 goes high to preset counter 80 which then produces the vertical time base from the timing signal input thereto.

The audio and other data contained in the data recovered by the ASK demodulator 52 are decoded by the decoder 60 in a conventional manner. The horizontal and vertical time base signals are input to the horizontal sync generator 64 and vertical sync generator 57, respectively, which generate in a conventional manner the horizontal and vertical sync signals. The horizontal and vertical sync signals control the timing of the video signal through a conventional switching circuit 65. The decoder 82 responds to the horizontal time base signal to produce decoded horizontal time base signals which become the AGC and clamp timing pulses and subcarrier phase reference.

An example of an arrangement for generating the horizontal and vertical sync signals is illustrated in FIG.8. With this arrangement the horizontal and vertical sync generators may be illustrated as a single block (not shown) replacing the separate blocks designated by reference numerals 64 and 57. The sync signal generator illustrated in FIG.8 which in addition to generating the horizontal and vertical sync signals may also be used to generate the color subcarrier and equalizations pulses, consists of a ROM 800 and D/A converter B02. The ROM receives the vertical and the horizontal time base output from the counters 80 and 70, respectively and outputs the required sync signals according to its program.

Figure 9:
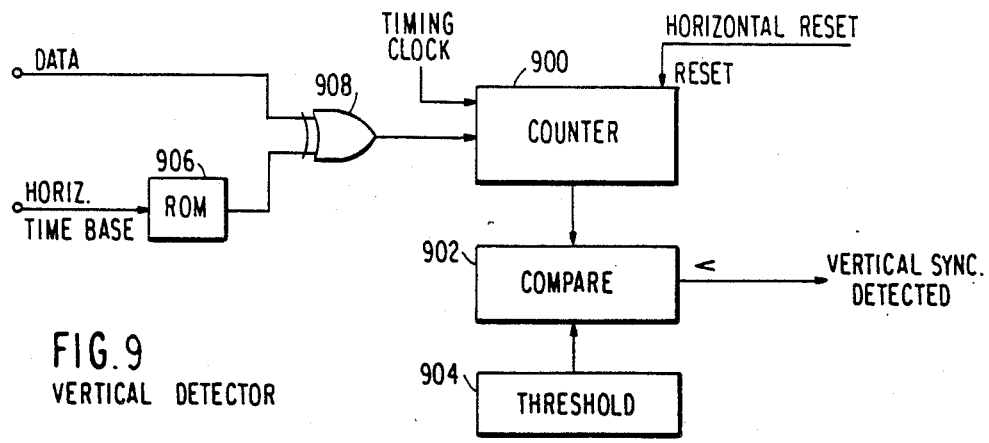
FIG. 9 is a block diagram of a preferred embodiment of a vertical unique word detector.

A form of vertical sync detector 78 is illustrated in FIG.9. The detector consists of a counter 900 clocked by system timing clocks and receiving at its data input the output from EX-OR gate 908. The two inputs to the gate 908 are the data input from ASK demodulator 52 and the output from a ROM 906 receiving at its input the horizontal time base. The output from the ROM is the correct vertical sync pattern. The EX-OR gate 908 functions to detect coincidence or lack thereof between the vertical unique word in the data and the correct vertical sync pattern. When coincidence occurs the output from the gate 908 is a logic low and the counter 900 is not incremented. For each out of sync occurrence that is when the vertical unique word in the data and the output from the ROM 906 are not in coincidence, the counter is incremented. The count in the counter 900 after a predetermined period such as the horizontal reset period is compared against a reference value provided by the threshold circuit 904. The threshold circuit may, for example be a register. When on comparison with the value provided by the threshold circuit the comparator determines that a vertical sync condition has been established. When so established the output from the comparator 902 supplies a logic high to the AND gate 76.

The horizontal detector 58 is illustrated in FIG. 6. This detector includes a shift register 600 having a number of stages equal to the number of pulses in the horizontal unique pulse sequence a plurality of switches 610, and an AND circuit 620. The incoming data pulse trait is shifted through the register 600 at the clock rate. Each stage of the register has a pair of output terminals, one corresponding to the logic one state, the other to the logic zero state. Therefore, when a stage is registering a logic one state the logic one output terminal will be energized. In a like manner, when a stage is storing a logic zero the logic zero output is energized. One of each pair of output terminals of each register stage is selectively connected to the AND circuit 620 through switches 610. The interconnection is such that when the horizontal unique pulse sequence is stored in register 600 the output of the AND circuit is high to signify reception of the unique pulse sequence. The output of AND circuit 620 is applied as one input to the AND gate 68 which operates in a manner described previously herein.

The circuitry of FIG. 6 may also be used as the vertical detector 78. When the circuitry is used for the Vertical detector the switches 610 are set to the register stage outputs to cause the AND circuit output to assume a high level when a vertical unique word is stored in the register 600.

The horizontal loss of sync detector 61 and the vertical loss of sync detector 72 may be similarly constructed in the manner illustrated in FIG. 7. For simplicity, the configuration of FIG. 7 will be described with reference to the horizontal loss of sync detector. The circuitry of FIG. 7 may also be used for the vertical loss of sync detector when supplied with the vertical time base and the ROM 710 and threshold 712 are programmed for detection of vertical sync loss.

The loss of sync detector consists of counter 700 which receives signals representing coincidence of the timing clock and the horizontal time base through AND gate 702, to produce a reset signal to a second counter 704 after a predetermined number of horizontal time base pulses have been counted The counter 704 is clocked by the pulses output from the AND gate 702 and receives at its data input the output from EX-OR gate 708. The two inputs to the EX-OR gate 708 are the data signals from the ASK demodulator and the output from the ROM 710. The ROM produces the correct horizontal sync pattern in response to the horizontal time base. The EX-OR gate functions to detect coincidence between the horizontal unique word in the unique pulse sequence and the correct horizontal sync pattern. The count in counter 704 represents the detected correspondence or lack thereof between the correct horizontal sync pattern and the horizontal unique word over a period determined by the first counter 700. The count in counter 704 is compared in comparator 706 against a predetermined threshold from threshold level generator 712 which may be a register. When the out of sync condition exists, the count in counter 704 will exceed the threshold and the comparator 706 output will assume a high level to indicate the out of sync condition and set (he flip-flop 62 (FIG.5).

Figure 10:
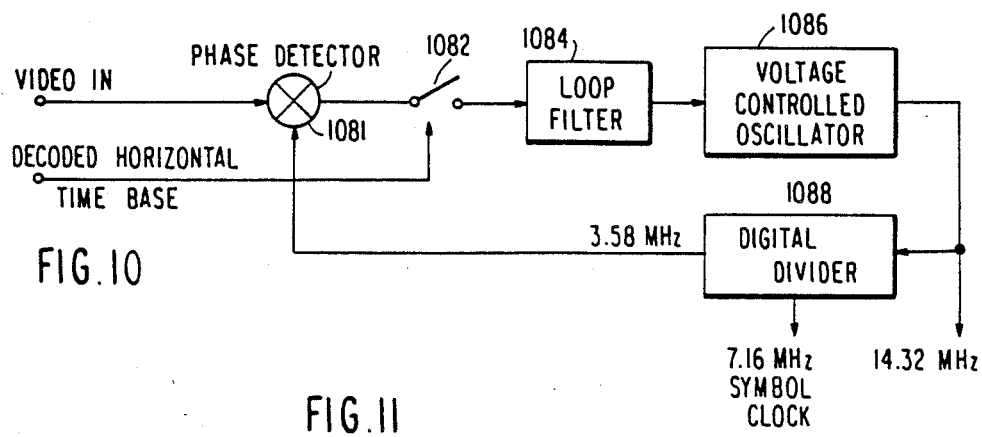
FIG. 10 is a block diagram of a preferred embodiment of a subcarrier sync circuit.

FIG. 10 illustrates a preferred embodiment of the subcarrier synchronization circuit 54. This circuit is a gated phase-locked loop comprised of a phase detector 1081 receiving the video signal. The phase detector also receives one output from a digital divider 1088 which output is selected to be at the color burst frequency of 3.58 MHz. A second output from divider 1088 is selected at 7.16 MHz, which is the symbol rate. The input to the divider 1088 is connected to the output from a voltage controlled oscillator 1006. The output of phase detector 1081 passes to a loop filter 1084 through a gate 1082 enabled when the horizontal unique pulse sequence is expected to be present. Thus, the video signal which is coincident with the detection of the horizontal pulse sequence is input to the loop filter 1084. The input to the loop filter is connected to the voltage controlled oscillator 1086 whose output is connected to the frequency divider 1088.

In operation, a phase error sample is obtained once per horizontal scan line from the phase detector 1081 which drives voltage controlled oscillator 1086. In this way, the 3.58 MHz signal and other clocking signals at the receiver are maintained in phase with the color subcarrier phase reference transmitted as part of the horizontal unique pulse sequence.

Figure 11:
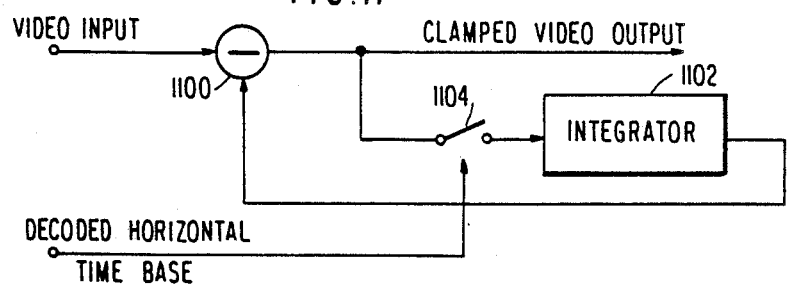
FIG. 11 is a block diagram of a preferred embodiment of a DC level clamp circuit.

FIG. 11 illustrates a preferred embodiment of the DC level clamp circuit 66. This circuit i ®a closed loop control circuit consisting of a difference circuit 1100, a gate circuit 1104 and integrator 1102. One input to the difference circuit is the video signal, while a second input is the output from the integrator 1102. The output from the difference circuit 1100 is connected to the input of the integrator through gate 1104. Gate 1104 is closed that is enabled upon receipt of an appropriately decoded signal from the horizontal time base. Thus, each time the horizontal unique pulse sequence is expected to be present the gate is enabled and the integrator 1102 is enabled to integrate up or down depending on the output of the difference circuit. Together the gate 1104 and integrator 1102 form an integrate and hold circuit, with the integrator integrating up or down when gate 1104 is enabled until the average or DC level of the horizontal pulse sequence at the output of the difference circuit 1100 is equal to the DC reference level of the received horizontal pulse sequence. This DC reference level is preferably zero volts.

Figure 12:
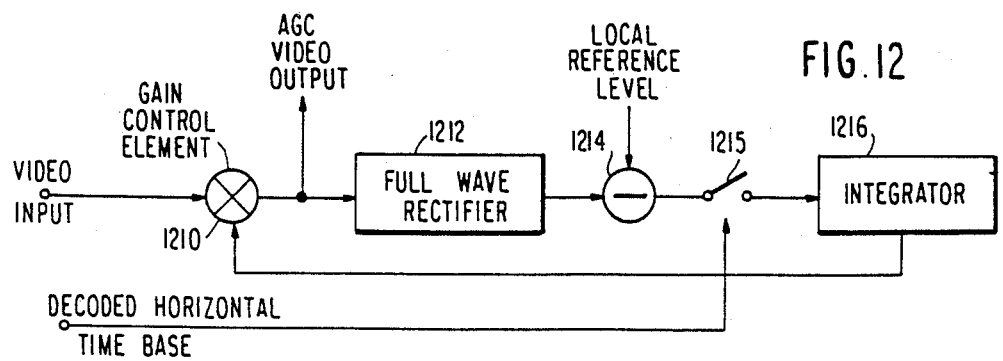
FIG. 12 is a block diagram of a preferred embodiment of an AGC circuit.

FIG. 12 illustrates the preferred embodiment of the AGC circuit 68. As with the preferred implementations of the subcarrier synchronizing circuit 62 and the DC clamp circuit 66, the AGC circuit 68 is preferably implemented as a closed loop control circuit. The AGC control loop consists of a gain control element 1210, a rectifier circuit 1212, difference circuit 1214, a gate 1215 enabled upon detection of the horizontal pulse sequence and an integrator 1216.

The control loop is enabled once per scan line coincident with the detection of the horizontal pulse sequence by enabling gate 1215 in response to the detection of the horizontal pulse sequence. The video signal gain adjusted by the gain control element 1210 in response to the integrator 1216 output is, during the period gate 1215 is enabled, rectified and applied as one input to difference circuit 1214. A second input to the difference circuit is a receiver produced reference level proportional to the desired gain. As the peak level of the pulses of the horizontal pulse sequence is a reference level for the gain adjustment, the output from the difference circuit 1215 is a gain error sample. This error sample is generated once each horizontal scan line as the horizontal pulse sequence is produced once per scan line. The difference circuit output passes through the enabled gate 1215 to the integrator 1216 which integrates up or down depending on the gain error during the horizontal pulse sequence and holds this value for the remainder of each scan line. The output of the integrator is applied to the gain control element 1210 to thereby adjust the gain in accordance with the gain error.

Thus, in accordance with the teachings of the invention a horizontal unique pulse sequence transmitted once per horizontal scan line in the horizontal blanking interval serves four different functions The pulse sequence is used to define a horizontal unique word, it is given a selected frequency which is detected and used at the receiver as the color subcarrier phase reference. The average lev ®1 of the pulse sequence is selected to define the DC reference level for DC restoration at the receiver. Finally, the peak amplitude of the sequence pulses is selected as an AGC reference level.

While the invention has been described with reference to particular embodiments thereof, it will be understood by those skilled in the art that various changes in f©rm and details may be made therein without departing from the spirit and scope of the invention.

What is claimed is:

1. In an analog TV transmission system of the type which produces a video signal transmitted to a receiver, said video signal being in the form of a raster scanning pattern of horizontal scan lines of video information with a horizontal; blanking interval between scan lines the improvement comprising:
   means for generating a horizontal unique pulse sequence during a horizontal blanking interval, the amplitudes of the pulses forming said pulse sequence being modulated to produce a horizontal unique word defining a horizontal line time base, and the frequency of the pulses of the pulse sequence being proportional to the frequency of the TV system color subcarrier signals to provide a color subcarrier phase reference.

2. A TV transmission system as claimed in claim 1, wherein said unique pulse sequence generating means comprises a multi-stage decoder means receiving a horizontal time base signal of said TV transmission system, switch means for selectively passing an output from each stage of said decoder and gate means for passing the unique pulse sequence determined by the states of the switches of said switch means.

3. In a TV reception system of the type receiving a video signal in a raster scanning pattern of horizontal scan lines, with a horizontal blanking interval between scan lines, said horizontal blanking interval containing a horizontal unique pulse sequence, said horizontal unique pulse sequence being transmitted as a data signal and containing a horizontal unique word defining a horizontal time base and the frequency of the pulses of the sequence being proportional to the frequency of the color subcarrier signals thereby providing a color subcarrier phase reference, receiving apparatus comprising:
   means for demodulating the data from the received video signals;
   means, responsive to the demodulated data, for detecting the horizontal unique pulse sequence;
   means responsive to detection of the horizontal unique pulse sequence for producing a horizontal time base signal;
   means responsive to the produced horizontal time base signal for producing a subcarrier phase reference; and
   means responsive to the produced horizontal time base signal for producing the horizontal and vertical sync pulses.

4. A TV reception system as claimed in claim 3, wherein said horizontal unique pulse sequence detecting means comprises register means having number of register stages equal to the number of bits in the unique pulse sequence, each stage having a logic high and a logic low output, switch means selectively supplied to either the logic high or the logic low output of each register stage such that the output of the switch means is a logic high when the horizontal unique sequence is in the register means, and gate means producing a logic high in response to a logic high at the output of the switch means.

5. A TV reception system as claimed in claim 4 further including a horizontal loss of sync detector comprises a first counter producing a reference period, a second counter receiving said horizontal time base as a clock input thereto, means for producing a correct horizontal sync pattern, means responsive to the demodulated data and the correct horizontal sync pattern for indicating non-coincidence between data signals and the correct horizontal sync pattern, second counter means responsive to said indicating means for counting non-coincidence between the data signals and said correct horizontal sync pattern, and comparator means for comparing the count in said second counter over the reference period against a reference level.

6. A TV reception system as claimed in claim 5 wherein said data signal includes a vertical unique word, and further comprising means responsive to the demodulated data for detecting the vertical unique word and means responsive to the detection of the vertical unique word for producing a vertical time base.

7. A TV reception system as claimed in claim 6 wherein said means for producing a horizontal sync pulse includes a ROM.

8. A TV reception system as claimed in claim 3 further including a subcarrier phase reference circuit comprising a phase detector receiving the video signal and a reference signal, switch means respond to the subcarrier phase reference signal derived from said horizontal time base for selectively passing the output from said phase detector and a voltage controlled oscillator for producing a signal having a frequency proportional to and in phase with the transmitted subcarrier reference signal.

9. In an analog TV transmission system of the type which produces a video signal transmitted to a receiver, said signal being in the form of a raster scanning pattern of horizontal scan lines of video information with a horizontal blanking interval between scan lines, the improvement comprising:
   means for generating a horizontal unique pulse sequence during a horizontal blanking interval, the amplitudes of the pulses forming said pulse sequence being modulated to produce a horizontal unique word defining a horizontal line time base, and the average level of the pulses of the pulse sequence being at the desired DC level of the video signal; at the receiver.

10. A TV transmission system as claimed in claim 9, wherein said unique pulse sequence generating means comprises a multi-stage decoder means receiving a horizontal time base signal of said TV transmission system, switch means for selectively passing an output from each stage of said decoder and gate means for passing the unique pulse sequence determined by the states of the switches of said switch means.

11. In a TV reception system of the type receiving a video signal in a raster scanning pattern of horizontal scan lines, with a horizontal blanking interval between scan lines, said horizontal blanking interval containing a horizontal unique pulse sequence, said horizontal unique sequence being transmitted as a data signal and containing a horizontal unique word defining a horizontal time base, the average level of the sequence pulses being at the desired DC level of the video signal, receiving apparatus comprising:
   means for demodulating the data from the received video signals;
   means, responsive to the demodulated data, for detecting horizontal unique pulse sequence;

means responsive to detection of the horizontal unique pulse sequence for producing a horizontal time base signal;

means response to the produced horizontal time base signal for producing a DC level clamp reference; and means responsive to the produced horizontal time base signal for producing the horizontal and vertical sync pulses.

12. A TV reception system as claimed in claim 11, wherein said horizontal unique pulse sequence detecting means comprises register means having a number of register stages equal to the number of bits in the unique pulse sequence, each stage having a logic high and a logic low output, switch means selectively supplied to either the logic high or the logic low output of each register stage such that the output of the switch means is a logic high when the horizontal unique sequence is in the register means, and gate means producing a logic high in response to a logic high at the output of the switch means.

13. A TV reception system as claimed in claim 12 further including a horizontal loss of sync detector comprising a first counter producing a reference period, a second counter receiving said horizontal time base as a clock input thereto, means for producing a correct horizontal sync pattern, means responsive to the demodulated data and the correct horizontal sync pattern for indicating means for counting non-coincidence between the data signals and said correct horizontal sync pattern, second counter means responsive to said indicating means for counting non-coincidence between the data signals and said correct horizontal sync pattern, and comparator means for comparing the count in said second counter over the reference period against a reference level.

14. A TV reception system as claimed in claim 13, wherein said data signal includes a vertical unique word, and further comprising means responsive to the demodulated data for detecting the vertical unique word and means responsive to the detection of the vertical unique word for producing a vertical time base.

15. A TV reception system as claimed in claim 14, wherein said means for producing a horizontal sync pulse includes a ROM.

16. A TV reception system as claimed in claim 11 further including a DC level clamp circuit comprising a difference circuit, switch means response to the DC level clamp timing signal derived from said horizontal time base, integrator means coupled to said switch means, the output of said integrator being one input to the difference circuit, another input thereto being the video signal.

17. In an analog TV transmission system of the type which produces a video signal transmitted to a receiver, said video signal being in the form of a raster scanning pattern of horizontal scan lines of video information with a horizontal blanking interval between scan lines, the improvement comprising:
means for generating a horizontal unique pulse sequence during a horizontal blanking interval, the amplitudes of the pulses forming said pulse sequence being modulated to produce a horizontal unique word defining a horizontal line time base, and the peak amplitude of the pulses of the pulse sequence defining a reference level for automatic gain control at the receiver.

18. A TV transmission system as claimed in claim 17, wherein said unique pulse sequence generating means comprises a multi-stage decoder means receiving a horizontal time base signal of said TV transmission system, switch means for selectively passing an output from each stage of said decoder and gate means for passing the unique pulse sequence determined by the states of the switches of said switch means.

19. In a TV reception system of the type receiving a video signal in a raster scanning patter of horizontal scan lines, with a horizontal blanking interval between scan lines, said horizontal blanking interval containing a horizontal unique pulse sequence, said horizontal unique pulse sequence being transmitted as a data signal and containing a horizontal unique word defining a horizontal time base, the peak amplitude of the sequence pulses defining a reference level for automatic gain control, receiving apparatus comprising:
means for demodulating the data from the received video signals;
means responsive to the demodulated data, for detecting the horizontal unique pulse sequence;
means responsive to detection of the horizontal unique pulse sequence for producing a horizontal time base signal;
means responsive to the produced horizontal time base signal for producing an AGC reference level; and
means for responsive to the produced horizontal time base signal for producing the horizontal and vertical sync pulses.

20. A TV reception system as claimed in claim 19, wherein said horizontal unique pulses sequence detecting means comprises register means having a number of register stages equal to the number of bits in the unique pulse sequence, each stage having a logic high and a logic low output, switch means selectively supplied to either the logic high or the logic low output each register stage such that the output of the switch means is a logic high when the horizontal unique sequence is in the register means, and gate means producing a logic high in response to a logic high at the output of the switch means.

21. A TV reception system as claimed in claim 20, further including a horizontal loss of sync detector comprising a first counter producing a reference period, a second counter receiving said horizontal time base as a clock input thereto, means for producing a correct horizontal sync pattern, means responsive to the demodulated data and the correct horizontal sync pattern for indicating non-coincidence between data signals and the correct horizontal sync pattern, second counter means responsive to said indicating means for counting non-coincidence between the data signals and said correct horizontal sync pattern, and comparator means for comparing the count in said second counter over the reference period against a reference level.

22. A TV reception system as claimed in claim 21, wherein said data signal includes a vertical unique word, and further comprising means responsive to the demodulated data for detecting the vertical unique word means responsive to the detection of the vertical unique word for producing a vertical time base.

23. A TV reception system as claimed in claim 22, wherein said means for producing a horizontal sync pulse includes a ROM.

24. A TV reception system as claimed in claim 19, further indicating an AGC circuit comprising a gain control means, rectifier means for rectifying the output from said gain control means, a difference circuit receiving this output from said rectifier means and a local reference level, switch means responsive to the AGC timing signal derived from said horizontal time base for selectively passing the output from said difference circuit, integrator means responsive to the signals passing through said switch means the output of said integrator means being an input to said gain control means, another input being the video signal.

* * * * *

UNITED STATES PATENT AND TRADEMARK OFFICE
CERTIFICATE OF CORRECTION

PATENT NO. : 4,970,592

DATED : November 13, 1990

INVENTOR(S) : Neal David BECKER et al

It is certified that error appears in the above-identified patent and that said Letters Patent is hereby corrected as shown below:

Col. 1, line 30, delete "Which" and insert --which--;

Col. 1, line 39, delete "H/2." and insert --H/2,--;

Col. 1, line 46, delete "betWeen" and insert --between--;

Col. 2, line 4, delete "folloWs" and insert --follows--;

Col. 2, line 4, delete "sYnch" and insert --synch--;

Col. 2, line 10, delete "H." and insert --H,--;

Col. 2, line 11, delete "9H." and insert --9H,--;

Col. 2, line 46, delete "restored." and insert --restored,--;

Col. 2, line 57, delete "control." and insert --control,--;

Col. 2, line 62, delete "retrace,." and insert --retrace,--;

Col. 2, line 68, after "PCM" insert -- - --;

Col. 3, line 2, delete "Rather,." and insert --Rather,--;

Col. 3, line 12, delete "however,." and insert --however,--;

Col. 3, line 19, delete "channels." insert --channels,--;

UNITED STATES PATENT AND TRADEMARK OFFICE
CERTIFICATE OF CORRECTION

PATENT NO. : 4,970,592
DATED : November 13, 1990
INVENTOR(S) : Neal David BECKER et al It is certified that error appears in the above-identified patent and that said Letters Patent is hereby corrected as shown below:

Col. 3, line 24, delete "therefore,." insert
--therefore,--;

Col. 3, line 31, delete "signal,." insert --signal,--;

Col. 3, lines 39 and 40, delete "restoration,." and
insert --restoration,--;

Col. 4, line 24, delete "restoration." and insert
--restoration,--;

Col. 4, line 31, delete "synchronization." and insert
--synchronization,--;

Col. 5, line 25, delete "2B." and insert --2B,--;

Col. 5., line 42, delete "invention,." and insert
--invention,--;
Col. 5, line 43, delete "desired,." and insert
--desired,--;

Col. 5, line 47, delete "MHz,." and insert --MHz,--;

Col. 5, line 57, delete "sequence,." and insert
--sequence,--;

Col. 5, line 60, delete "Words" and insert --words--;

Col. 6, line 1, delete "therefore,." and insert
--therefore,--;

Col. 6, line 35, delete "generator." and insert
--generator,--;

UNITED STATES PATENT AND TRADEMARK OFFICE
CERTIFICATE OF CORRECTION

PATENT NO. : 4,970,592

DATED : November 13, 1990

INVENTOR(S) : Neal David BECKER et al

It is certified that error appears in the above-identified patent and that said Letters Patent is hereby corrected as shown below:

Col. 6, line 66, delete ":a" and insert --a--;

Col. 7, line 52, delete ";@ " and insert --is--;

Col. 8, line 25, delete "B02" and insert --802--;

Col. 8, line 51, after "that" insert --the count in counter 900 is below the threshold level,--;

Col. 8, line 59, delete "trait" and insert --train--;

Col. 9, lines 9 and 10, delete "Vertical" and insert --vertical--;

Col. 9, line 48, delete "(he" and insert --the--;

Col. 9, line 58, delete "1006" and insert --1086--;

Col. 10, line 7, delete ";@ " and insert --is--;

Col. 10, line 65, delete "lev@ 1" and insert --level--;

Col. 11, line 4, delete "f@rm" and insert --form--;

UNITED STATES PATENT AND TRADEMARK OFFICE
CERTIFICATE OF CORRECTION

PATENT NO. : 4,970,592

DATED : November 13, 1990

INVENTOR(S) : Neal David Becker, et al

It is certified that error appears in the above-identified patent and that said Letters Patent is hereby corrected as shown below:

Col. 12, line 45, after "signal" delete ";".

Signed and Sealed this

Twenty-second Day of September, 1992

Attest:

DOUGLAS B. COMER

Attesting Officer

Acting Commissioner of Patents and Trademarks